(12) United States Patent
Dillenberger et al.

(10) Patent No.: US 8,869,160 B2
(45) Date of Patent: Oct. 21, 2014

(54) GOAL ORIENTED PERFORMANCE MANAGEMENT OF WORKLOAD UTILIZING ACCELERATORS

(75) Inventors: Donna N. Dillenberger, Yorktown Heights, NY (US); Matthew S. Thoennes, West Harrison, NY (US); Peter Yocom, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 12/647,272

(22) Filed: Dec. 24, 2009

(65) Prior Publication Data

US 2011/0161972 A1    Jun. 30, 2011

(51) Int. Cl.
G06F 9/46        (2006.01)
G06F 9/50        (2006.01)
G06F 9/52        (2006.01)

(52) U.S. Cl.
CPC .......... *G06F 9/5044* (2013.01); *G06F 9/5083* (2013.01); *G06F 9/505* (2013.01); *G06F 9/52* (2013.01)
USPC ............................ 718/104; 718/103; 718/105

(58) Field of Classification Search
CPC .......... G06F 9/52; G06F 9/5016; G06F 9/505
USPC ....................................................... 718/104
See application file for complete search history.

(56) References Cited

U.S. PATENT DOCUMENTS

| | | | |
|---|---|---|---|
| 5,473,773 A | 12/1995 | Aman et al. | |
| 5,675,739 A | 10/1997 | Eilert et al. | |
| 5,974,462 A | 10/1999 | Aman et al. | |
| 6,192,389 B1 * | 2/2001 | Ault et al. | 718/101 |
| 6,230,183 B1 | 5/2001 | Yocom et al. | |
| 6,470,478 B1 | 10/2002 | Bargh et al. | |
| 6,779,181 B1 * | 8/2004 | Yu et al. | 718/102 |
| 7,051,188 B1 * | 5/2006 | Kubala et al. | 712/29 |
| 7,451,070 B2 | 11/2008 | Devins et al. | |
| 2002/0087611 A1 * | 7/2002 | Tanaka et al. | 709/1 |
| 2007/0198983 A1 * | 8/2007 | Favor et al. | 718/104 |
| 2007/0283349 A1 | 12/2007 | Creamer et al. | |

(Continued)

FOREIGN PATENT DOCUMENTS

WO    WO 01/37079    5/2001

OTHER PUBLICATIONS

Aman et al., Adaptive ALgorithms for Managing a Distributed Data Processing Workload, IBM Systems Journal, vol. 36, No. 2, 1997.*

(Continued)

*Primary Examiner* — Lewis A Bullock, Jr.
*Assistant Examiner* — Kevin X Lu
(74) *Attorney, Agent, or Firm* — Fleit Gibbons Gutman Bongini & Bianco PL; Thomas Grzesik

(57) ABSTRACT

A method, information processing system, and computer readable storage medium are provided for dynamically managing accelerator resources. A first set of hardware accelerator resources is initially assigned to a first information processing system, and a second set of hardware accelerator resources is initially assigned to a second information processing system. Jobs running on the first and second information processing systems are monitored. When one of the jobs fails to satisfy a goal, at least one hardware accelerator resource in the second set of hardware accelerator resources from the second information processing system are dynamically reassigned to the first information processing system.

20 Claims, 8 Drawing Sheets

(56) References Cited

U.S. PATENT DOCUMENTS

| | | | |
|---|---|---|---|
| 2008/0301696 A1* | 12/2008 | Tantawi et al. | 718/105 |
| 2009/0055834 A1* | 2/2009 | Ding et al. | 718/104 |
| 2011/0191783 A1* | 8/2011 | Le Moal | 718/105 |

OTHER PUBLICATIONS

Bacigalupo et al., "An Investigation into the Application of Different Performance Prediction Methods to Distributed Enterprise Applications,", Journal of Super Computing, 34, 93-111, 2005.*

Petri Kukkala, Dynamic Power Management for UML Modeled Applications on Multiprocessor SoC, Dec. 2006, Tampere University of Technology, Institute of Digital and Computer Systems, Tampere, Finland.

Aman. J., et al., "Adaptive Algorithms for Managing a Distributed Data Processing Workload,: IBM Systems Journal, Armonk, NY, vol. 36, No. 2, Jan. 1, 1997, pp. 242-283, XP000656512, ISSN" 0018-8670.

International Search Report and Written Opinion dated Jul. 27, 2011 for PCT/EP2010/069559.

* cited by examiner

GOAL ORIENTED PERFORMANCE MANAGEMENT OF WORKLOAD UTILIZING ACCELERATORS

FIELD OF THE INVENTION

The present invention generally relates to the field of workload management, and more particularly relates to managing workloads utilizing hardware accelerators.

BACKGROUND OF THE INVENTION

General purpose processors such as Intel®, AMD®, and IBM POWER® are designed to support a wide range of workloads. If processing power beyond existing capabilities is required, then hardware accelerators may be attached to a computer system to meet the requirements of a particular application. Hardware accelerators can also be used to address performance bottlenecks. These accelerators are viewed as computing resources that can be utilized by the system. Examples of hardware accelerators include field programmable arrays (FPGAs), the IBM Cell B.E. (broadband engine) processor, and graphics processing units (GPUs). Accelerators have a better price/performance point for their specific tasks than a general processor of the system. Hardware accelerators can be attached directly to the processor complex or nest, such as through PCI-express I/O slots or using high-speed networks such as Ethernet and Infiniband®.

Conventional workload management systems distribute accelerator resources assigned to a particular host system among the jobs running on the host. However, these conventional workload management systems, in general, do not effectively and efficiently utilize available accelerator resources assigned across multiple systems.

SUMMARY OF THE INVENTION

One embodiment of the present invention provides a computer implemented method for dynamically manages accelerator resources. According to the method, a first set of hardware accelerator resources is initially assigned to a first information processing system, and a second set of hardware accelerator resources is initially assigned to a second information processing system. Jobs running on the first and second information processing systems are monitored by at least one processor. When one of the jobs fails to satisfy a goal, at least one hardware accelerator resource in the second set of hardware accelerator resources from the second information processing system is dynamically reassigned to the first information processing system.

Another embodiment of the present invention provides an information processing system for dynamically manages accelerator resources. The information processing system includes a memory and a processor that is communicatively coupled to the memory. The information processing system also includes an assignment manager that is communicatively coupled to the memory and the processor. The assignment manger is configured to initially assign a first set of hardware accelerator resources to a first information processing system and a second set of hardware accelerator resources to a second information processing system. Jobs running on the first and second information processing systems are monitored. When one of the jobs fails to satisfy a goal, at least one hardware accelerator resource in the second set of hardware accelerator resources from the second information processing system is dynamically reassigned to the first information processing system.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Operating Environment

Figure 1:
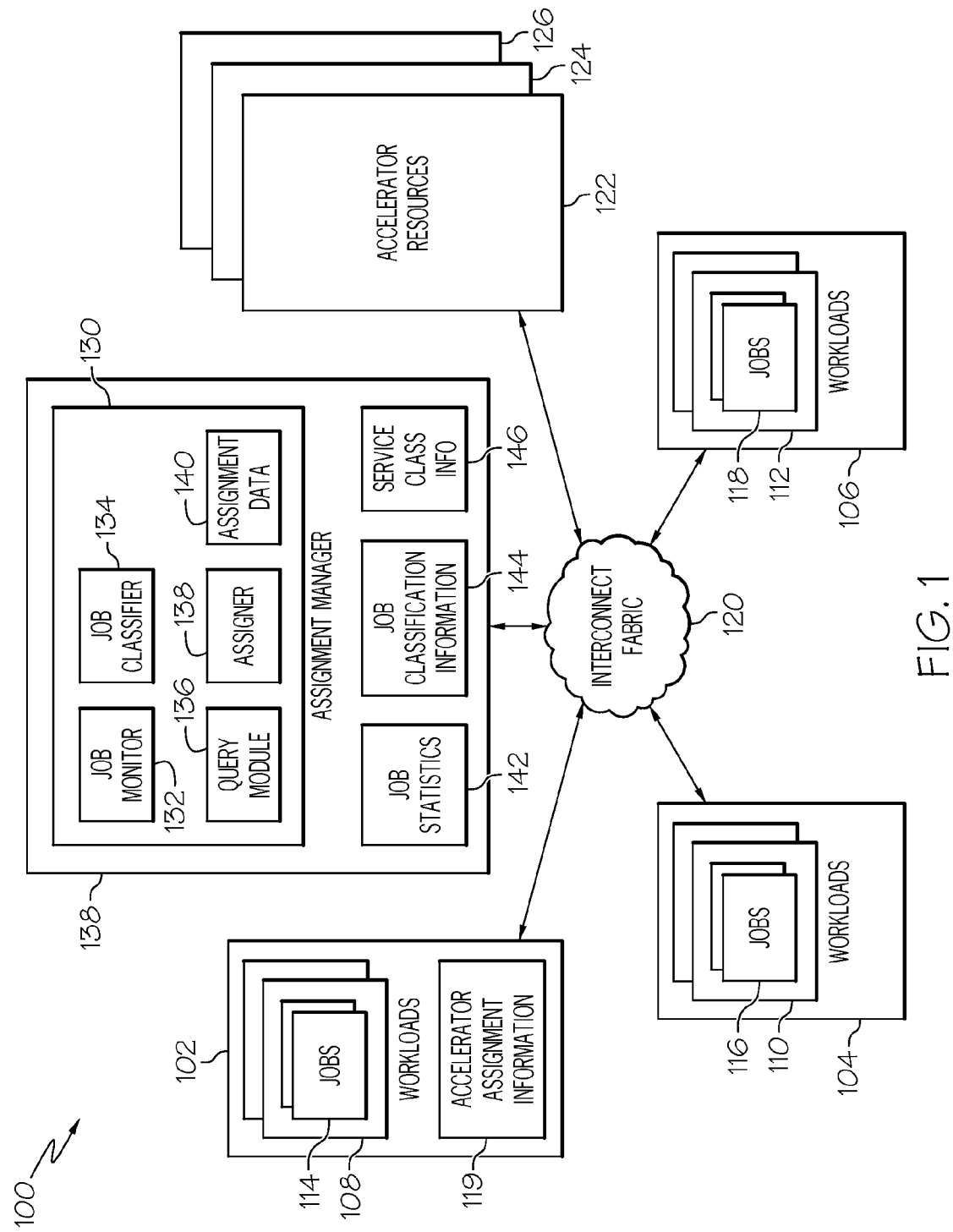
FIG. 1 is a block diagram illustrating an operating environment according to one embodiment of the present invention.

FIG. 1 shows an exemplary operating environment applicable to embodiments of the present invention. The exemplar environment 100 of FIG. 1 is a parallel-distributed processing system that operates in an SMP computing environment. In an SMP computing environment, parallel applications can have several jobs (processes) that execute on multiple processors on the same processing node. While the exemplary environment of FIG. 1 is an SMP environment, the present invention is not so limited. Other architectures are applicable as well, and some embodiments of the present invention operate within a single system.

FIG. 1 shows a plurality of host systems 102, 104, and 106. Each host system 102, 104, and 106 has one or more workloads 108, 110, and 112 that each include one or more jobs 114, 116, and 118 to be performed. Each host system 102, 104, and 106 also has accelerator assignment information 119 that identifies the hardware accelerators currently assigned to the host system. Each of the host systems 102, 104, and 106 are communicatively coupled to an interconnect fabric 120, such as an Ethernet network or Infiniband®. Multiple hardware accelerators 122, 124, and 126 are also communicatively coupled to the interconnect fabric 120. Each hardware accelerator 122, 124, and 126 is a special-purpose hardware component or appliance that can perform a limited set of specific functions with optimized performance (as compared to a general-purpose processor). One or more of the host systems 102, 104, and 106 utilizes one or more of the accelerators 122, 124, and 126 to perform at least a portion of its workload.

FIG. 1 also shows an information processing system 128 having an assignment manager 130. The assignment manager 130 dynamically assigns one or more accelerators 122, 124, and 126 to a host system 102, 104, and 106. This dynamic reassignment of accelerators allows accelerators to be assigned to various hosts based on the performance and importance of the service classes/jobs running on each of the hosts. If a host is running a high priority job that is not meeting its performance goal, the assignment manager can dynamically reassign accelerator resources from other hosts that are either running lower priority jobs or jobs that are not impacted by this dynamic reassignment. This ability to balance accelerator resources based on workloads allows a higher overall utilization to be achieved. Also, in situations in which accelerator resources are constrained, the most important jobs can be prioritized.

The assignment manager 130 includes a job monitor 132, a job classifier 134, a host querying module 136, an accelerator assigner 138, and initial assignment configuration data 140. The information processing system 128 also includes job statistics 142, job classification information 144, and service class information 146. In further embodiments, the assignment manager 130 can reside on one or more of the host systems.

Dynamic Reassignment of Accelerator Resources

In the illustrated embodiment, the job classifier 134 of the assignment manager 130 analyzes each of the jobs 114, 116, and 118 residing at the hosts systems 102, 104, and 106 and classifies each job as a particular type of work, which is referred to as its "service class". Each service class has an associated goal and priority. For example, a goal can be a response time with a target such as "finish within five seconds". In this embodiment, the goal and importance of a service class is set by an administrator. This information is stored within the service class information 146. The job classifier 134 analyzes the attributes of a job (such as job name, user-id of a user who submitted the job, and the like) and identifies which service class the job falls into based on the attributes of the job and the service class information 146. In an alternative embodiment, the job classifier 134 uses statistical information 142 associated with a job to determine which service class to associate with the job. The jobs can be classified into service classes based on other associated attributes as well.

Figure 2:
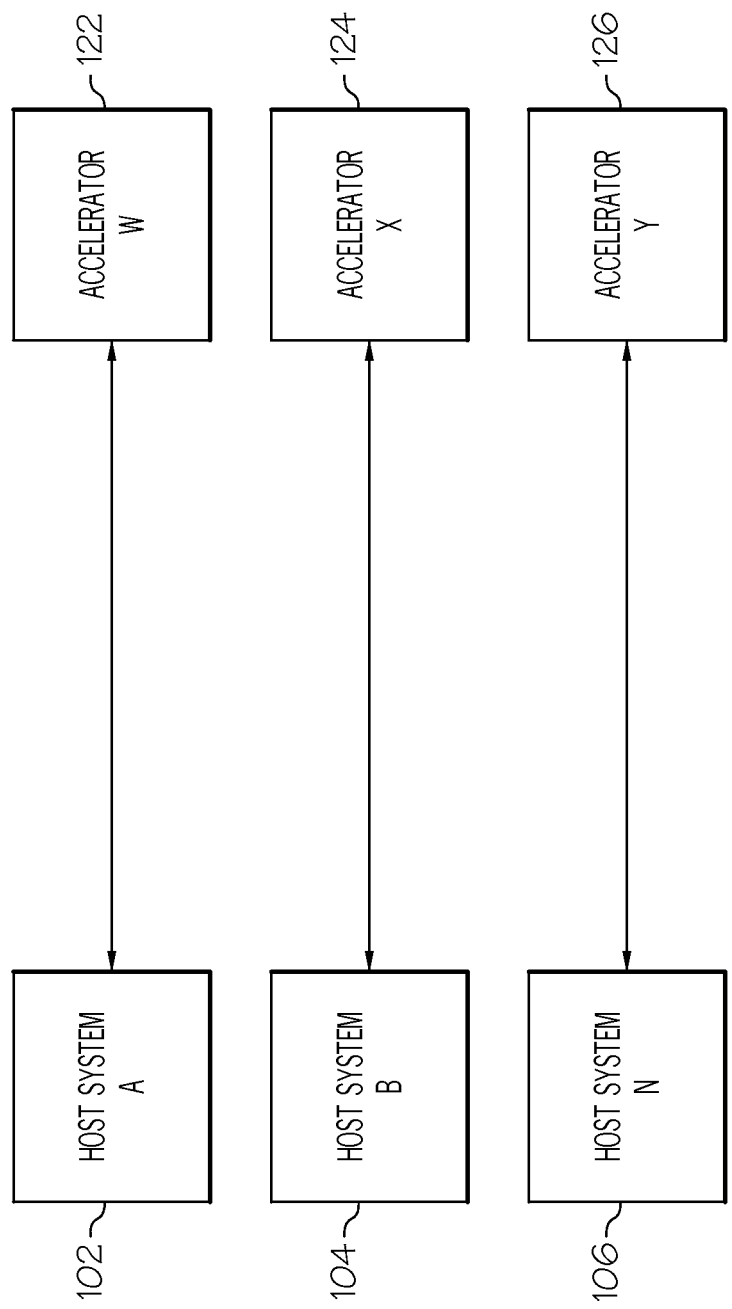
FIG. 2 is a block diagram illustrating initial assignment of accelerator resources to host systems according to one embodiment of the present invention.

In the illustrated embodiment, the assignment manager initially assigns the accelerators 122, 124, and 126 to the host systems 102, 104, and 106 based on the initial assignment configuration data 140. Initial assignment configuration data 140, in this embodiment, is predefined accelerator allocations that notify a host system which accelerators have been allocated to that particular system. As shown in the example of FIG. 2, Accelerator W 122 is initially assigned to Host System A 102, Accelerator X 124 is initially assigned to Host System B 104, and Accelerator Y is assigned to Host system N 106.

After an accelerator is assigned to a host system by the assignment manager 130, the host system can send part of its workload to the assigned accelerator. In this embodiment, the job monitor 132 of the assignment manager monitors each of the jobs 114, 116, and 118 in each of the workloads 108, 110, 112 to determine the job statistics 142. The job monitor 132 monitors statistics such as the execution time of a job at the accelerator, the number of accelerators being used by a job, how long a job was held in the queue of an accelerator prior to being performed by the accelerator, and the like. This information is stored as the job statistic information 142. In an embodiment where the job classifier 134 uses statistical information to assign a job to a service class, the job classifier 142 uses the job statistic information 142 to determine the service class to associate with a job.

The priorities of the service classes can be, but are not required to be, predefined. In one example, the job monitor 132 monitors parameters such as the time each job stays within an accelerator queue waiting to be performed, the time it takes for a job to be completed by an accelerator, the number of accelerators a job uses, and the like. The job monitor 132 then determines averages for the service classes associated with the jobs based on this statistical information. The assignment manager is then able to determine a completion goal, queue time average, and the like for a given service class based on the averages associated with the jobs of that given service class. In one example, if the average time for all of the jobs of a given service class to be completed by the accelerators was five seconds, then this can be set as the performance goal of that service class. In an alternative embodiment, each of the host systems monitors its own jobs and records statistical information, instead of having the assignment manager 130 perform these operations. This information is then passed to the assignment manager 130 when needed. The assignment manager 130 uses the information associated with a service class (e.g., goals and priorities) to determine how to dynamically assign the accelerators to the host systems.

After the jobs have been assigned to a service class and as each host system sends jobs to its assigned accelerator(s), the job monitor 132 monitors each job to ensure that the service classes are satisfying their goals. For example, statistical data (e.g., job statistical information 142) from running jobs is collected and aggregated for each job of the service class. With this aggregated performance data, the performance of the service class can be determined as an average of all of the jobs that are assigned to that service class. The job monitor 132 identifies the goal(s) of a service class. In one example, these goals are related to accelerator queue time, execution time, and the like. Based on the aggregated statistical information, the assignment manager 130 determines if the service class is missing its goal(s). For example, a service class has a goal that states jobs in the service class should have an average response time of 10 seconds. If there are 3 jobs in the service class that have response times of 5 seconds, 10 seconds, and 30 seconds, then the average response time is 15 seconds and the service class is failing to satisfy its goal.

Based on such information, the assignment manager 130 determines whether or not to dynamically change the accelerator assignment configuration for the host system that issued the job of the service class that has failed its goal.

In this embodiment, the assignment manager 130 uses the priority of a service class when determining whether or not additional accelerator resources should be added. For example, each service class (and hence its jobs) has a priority level. If the priority level of a service class is above a threshold, then the assignment manager 130 can decide to make a dynamic reassignment of accelerator resources. If the priority level is below a given threshold, then the assignment manager 130 decides that no dynamic reassignment of accelerator resources is necessary. In some embodiments, service classes do not have a priority level.

When determining whether or not to dynamically reassign additional accelerators to a given host, the assignment manager 130 determines the impact of this reassignment on that host. The assignment manager 130 uses the statistical information 142 associated with the job(s) of a service class to determine whether adding additional accelerators would ensure that the goal associated with the service class is achieved. In one example, the assignment manager 130 monitors the jobs of one or more service classes of a host system to identify the queue times, execution times, average times, and the like for each job in the service class and aggregates this information into the jobs' service class. This information is used to estimate the impact of adding additional accelerators based on these statistics.

Figure 8:
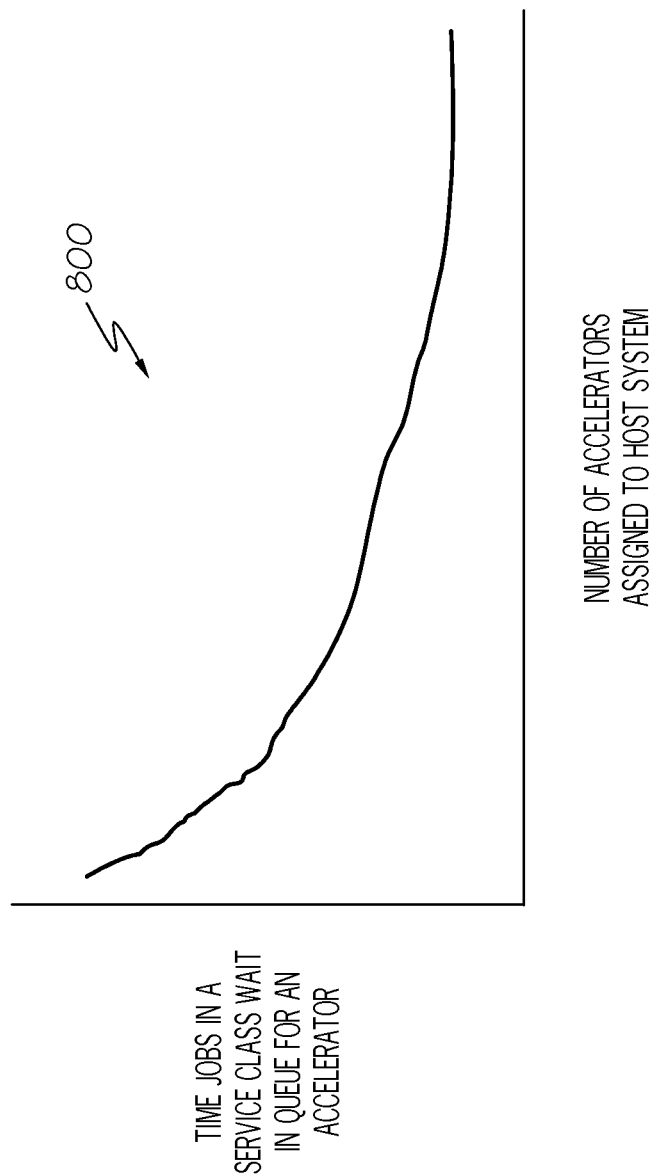
FIG. 8 illustrates the relationship between how long jobs in a service class wait to use an accelerator and the number of accelerators assigned to a host system according to one embodiment of the present invention.

For example, the assignment manager 130 uses the data collected for a service class (i.e., job statistical information 142 such as queue times, execution times, average times, and the like for each job in the service class that indicate a job's use of an accelerator) and generates a graph for each service class, such as the exemplary graph 800 shown in FIG. 8. This graph has an x-axis that shows the number of accelerators assigned to a host system and a y-axis that shows the time jobs in a service class wait for accelerator resources. With this information, the assignment manager 130 is able to learn the relationship between how long the jobs for a service class wait to use an accelerator and the number of accelerators assigned to a host system. From a queuing model such as that shown in FIG. 8, the assignment manager 130 can project the impact on a service class's average response time if dynamic allocation of accelerators is performed. If more accelerators are added to the host systems, the time that jobs wait in the queue decreases. If accelerators are taken away from a host system, the time that jobs wait in the queue increases. The change in the time that jobs in a service class on average wait on the queue directly effects the average response time of the service class.

In another embodiment, the host system itself performs this estimation, instead of the assignment manager 130. In such an embodiment, if the host system determines that a gain would be obtained from being assigned additional accelerators, then the host system requests the additional accelerator resources from the assignment manager 130.

If the assignment manager determines that a gain would be obtained from assigning one or more additional accelerators to a given host system (or if the assignment manager receives a request for additional accelerator resources from the host system), the assignment manager 130 then determines the impact on the other host systems of dynamically reassigning the additional accelerator resources to the given host system. In one example, if the assignment manager 130 (or the given host system) determines that the average queue wait time for a service class missing its goal would be decreased (so as to result in a faster completion time) by dynamically reassigning one or more additional accelerator resources, then the assignment manager 130 determines the impact of this accelerator assignment on the other host systems. There is an impact to the other host systems because the dynamic reassignment of additional accelerator resources to the given host system results in accelerator resources that are currently assigned to other host systems to be dynamically reassigned to the given host system. In this embodiment, the assignment manager 130 estimates how the de-allocation of one or more accelerator resources from the other systems affects their workloads by analyzing the graphs 800 associated with one or more service classes/host systems. The assignment manager 130 analyzes the graphs to determine how de-allocating an accelerator resource from a host system and allocating that resource to another system would affect both of these host systems.

In the embodiment in which host systems maintain their own statistical information for their jobs/service classes, the assignment manager 130 queries the other host systems, via the host querying module 136. This query requests an impact estimate from each of the other host systems. When a host system receives this query from the assignment manager, the host system performs an impact estimate. In one example, each of the hosts systems analyzes its statistical information 142 associated with its jobs to determine how the de-allocation of one or more accelerator resources impacts its workload. The statistical information can include queue wait times, execution times, number of accelerators being used, and the like. Each host system can estimate how the de-allocation of one or more accelerator resources would affect its workload by analyzing the statistical information or the graph associated with each of its service classes. The other host systems then send their estimations to the assignment manager.

Each estimation indicates whether the de-allocation and reassignment negatively impacts the system or has a neutral effect, and can also quantify the effect. In one example, an impact estimation for a host system indicates that queue waiting time is increased by 5%, 5 seconds, or the like; that the completion time stays the same or increases by a given amount; and that the probability of a job failing to satisfy its goal increases by a given amount.

The assignment manager 130 then compares the impact of adding additional accelerator resources to the given host system against the impact of de-allocating accelerator resources from the other host systems. If the positive impact on the given system outweighs the negative impact on the other systems, then the assignment manager 130 dynamically reassigns one or more accelerator resources that are currently assigned to other host systems to the given host system.

In this embodiment, this comparison process utilizes various assignment thresholds. In one example, if the assignment manager 130 determines that the positive impact associated with the given host system is above a first threshold (such as queue wait time is decreased by more than 3 seconds or the probability that the job goal will be satisfied is greater than 80%) and that the negative impact on the other host systems is below a second threshold (such as queue wait time is increased by 3 seconds), then the assignment manager 130 dynamically reassigns the accelerator resources to the given host system.

Also, the assignment manager 130 can compare the impact estimates of the other host systems to determine the host system from which to take the accelerator resources. In one example, if there are two other host systems and the de-allocation impact for the first host system is greater than for the second host system, the assignment manager 130 selects the accelerator resources associated with the second host system to be reassigned to the given host system. This reduces the negative impact of the reassignment on the other host systems.

In one embodiment, after identifying the accelerator resources to dynamically reassign, the assignment manager 130 informs the host system currently assigned to those accelerator resources to stop sending new jobs to those accelerator resources. After all existing jobs have been completed, the assignment manager 130 de-allocates the accelerator resources from the current host system, and the host system updates its assignment information to reflect this de-allocation. The assignment manager 130 then assigns these accelerator resources to the given host system, which subsequently updates its assignment information to reflect this assignment. The given host system then begins to issue jobs from its workload to the newly assigned accelerator resources.

Figure 3:
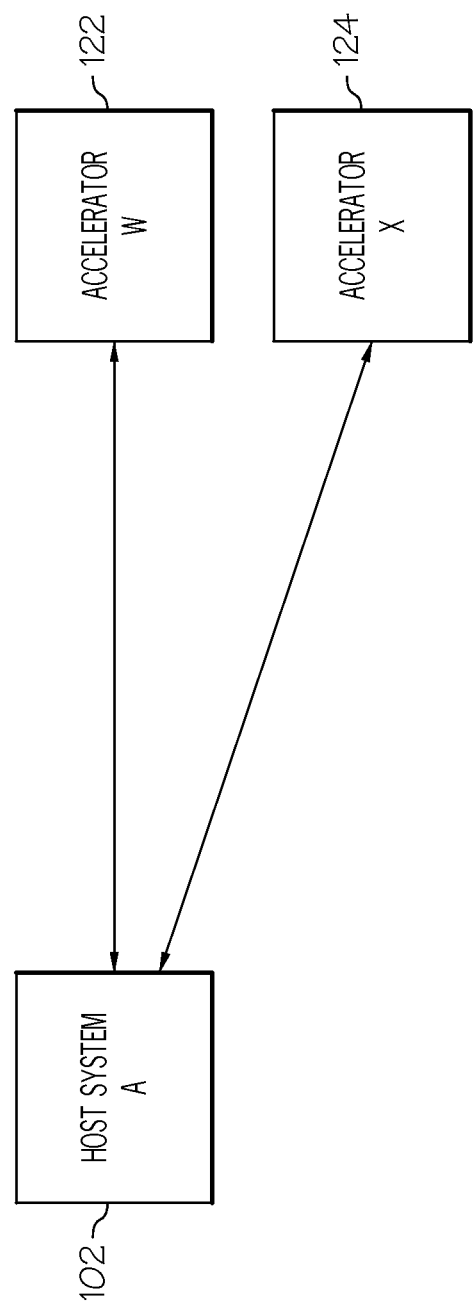
FIG. 3 is a block diagram illustrating dynamic reassignment of accelerator resources to a host system according to one embodiment of the present invention.

FIG. 3 shows an example in which Accelerator X 124, which was originally assigned to Host System B 104 as shown in FIG. 2, has been dynamically reassigned to Host System A 102. Host System A 102 is now able to issue jobs from its workload to its initial accelerator, Accelerator W 122, as well as the newly assigned accelerator, Accelerator X 124.

Accordingly, the present invention efficiently and effectively manages a pool of accelerator resources. These accelerator resources are initially assigned to various host systems. Then, based on factors such as performance and the priority of the jobs running on each of these systems, these accelerator resources can be reassigned to other host systems.

Operational Flow Diagrams

Figure 4:
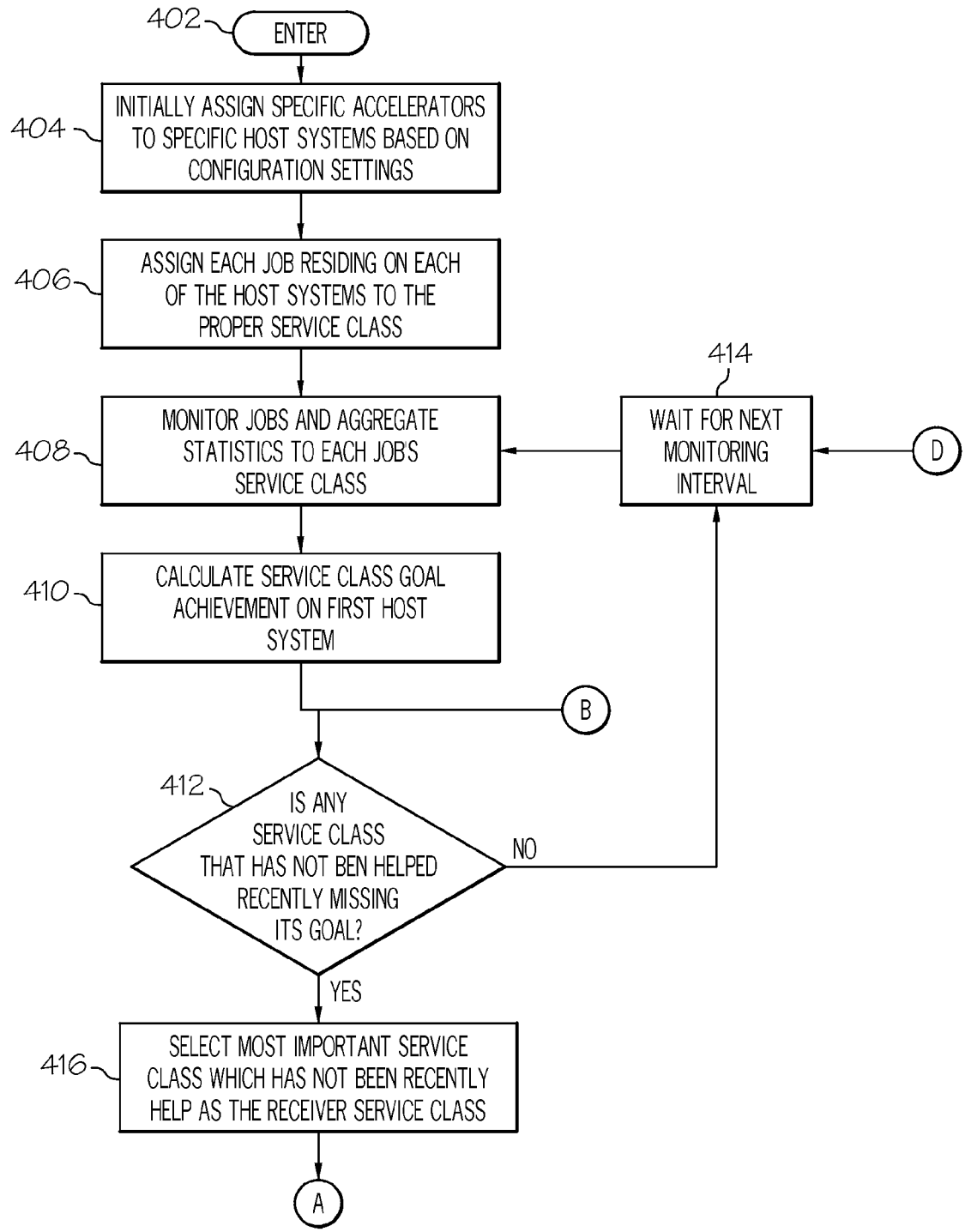
FIGS. 4 to 6 are operational flow diagrams illustrating a process for dynamically managing accelerator resources according to one embodiment of the present invention.
Figure 5:
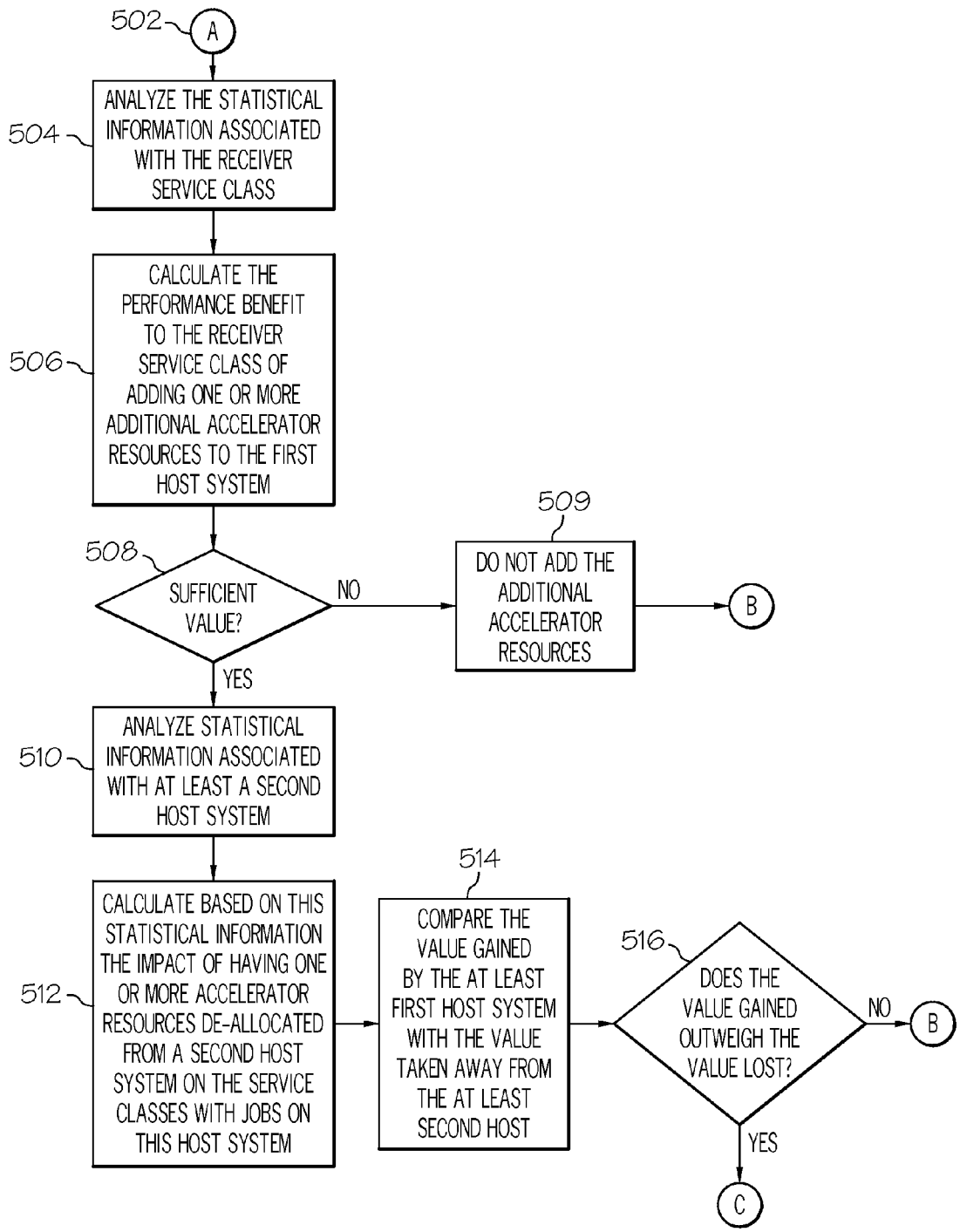
Figure 6:
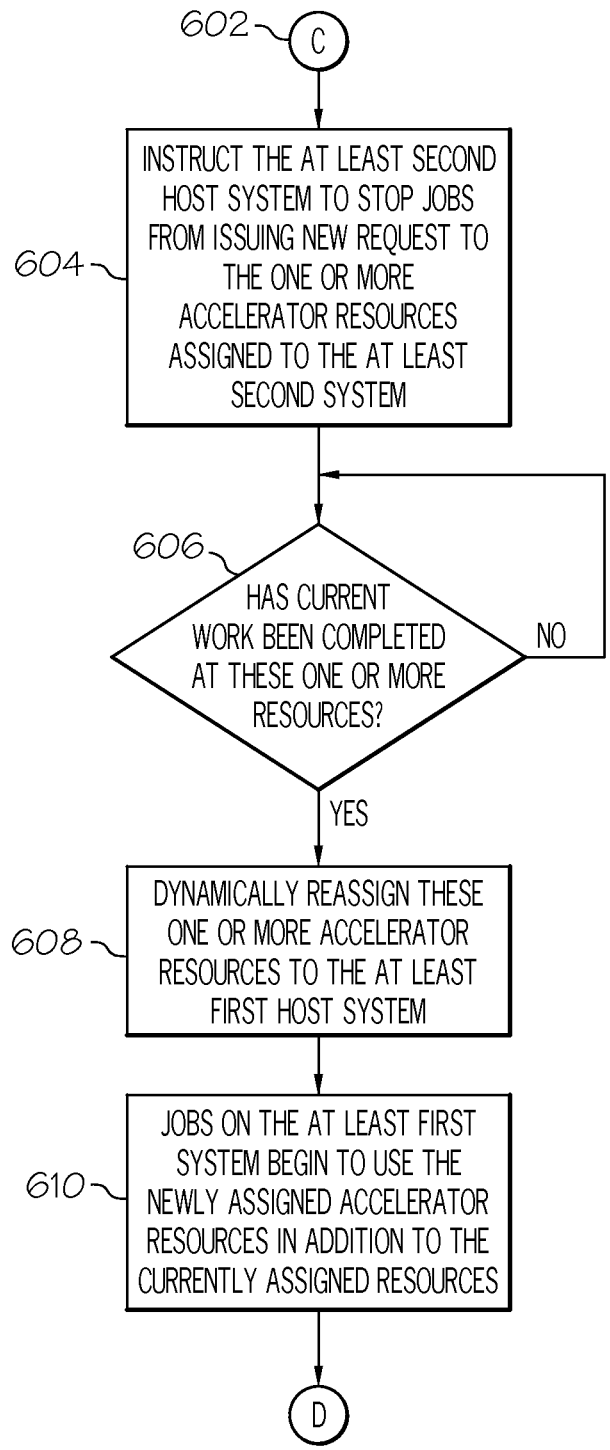

FIGS. 4, 5, and 6 are operational flow diagrams illustrating a process for dynamically managing accelerator resources in accordance with one embodiment of the present invention. The operational flow diagram of FIG. 4 begins at step 402 and flows directly to step 404. An assignment manager 130, at step 404, initially assigns accelerator resources to multiple host systems 102, 104, and 106. The assignment manager, at step 406, assigns a service class to each job 114, 116, and 118 of each host system 102, 104, and 106.

The assignment manager 130, at step 408, collects statistical information 142 associated with each job 114 on a first host system and aggregates this statistical information to each job's service class. Based on the statistical information aggregated to each service class, the assignment manager 130, at step 410, determines how well each service class is achieving its goal on the first host system. The assignment manager 130, at step 412, determines if any service class which has not recently been helped by adding accelerator resources is missing its goal. If the determination is negative, the assignment manager 130, at step 414, waits for the next monitoring interval. When the next monitoring interval begins, the assignment manager 130 returns to step 408. If the result of the determination at step 412 is positive, the assignment manager 130, at step 416, selects the most important service class which is missing its goal. As discussed above, "importance" can be measured by priority level, the service class that would gain the most benefit from adding additional accelerator resources, or the like. The selected service class is referred to as the receiver service class. At this point the control flows to entry point A (502) of FIG. 5.

At step 504 the assignment manager 130 analyzes the statistical information for the receiver service class. The assignment manager 130, at step 506, determines, based on this analysis, the impact on the performance of the receiver service class of adding one or more accelerator resources to the first host system. The assignment manager 130, at step 508, determines if this impact provides sufficient value (e.g., if the gain of the given host system is greater than a loss to the system where the resources are de-allocated) to justify reallocating resources. U.S. Pat. No. 5,473,773, which is commonly owned and herein incorporated by reference in its entirety, discusses receiver class value in greater detail. If the result of this determination is negative, the assignment manager 130, at step 509, determines not to reallocate resources and the control returns to step 412 at entry point B to determine if any other service classes are missing their goal.

If the result of the determination at step 506 is positive, the assignment manager 120, at step 510, analyzes statistical information 142 associated with a second host system. The assignment manager 130, at step 512, determines, based on this statistical information 142, the impact of having one or more accelerator resources de-allocated from the second host system on the service classes with jobs on the second host system. The assignment manager 130, at step 514, compares the value gained by adding these resources to the first host system against the value taken away from the second host system by the reassignment of these resources.

The assignment manager 130, at step 516, determines if the value gained outweighs the value lost. If the result of this determination is negative, the control flow returns to step 412 at entry point B to determine if any other service classes are missing their goal. If the result of this determination is positive the control flows to entry point C (602) of FIG. 6. The assignment manager 130, at step 602, instructs the second host system to stop jobs from issuing new requests to one or more accelerator resources initially assigned to the second host system. The assignment manager 130, at step 606, determines if the current work at these accelerator resources has been completed. If the result of this determination is negative, the assignment manager 130 continues to determine if the work has been completed. If the result of this determination is positive, the assignment manager, at step 608, dynamically reassigns the one or more accelerator resources to the first host system. The jobs on the first host system, at step 610, use both the initially assigned accelerator resources and the newly assigned accelerator resources. The control flow returns to step 414 at entry point D to wait for the next monitoring interval.

Information Processing System

Figure 7:
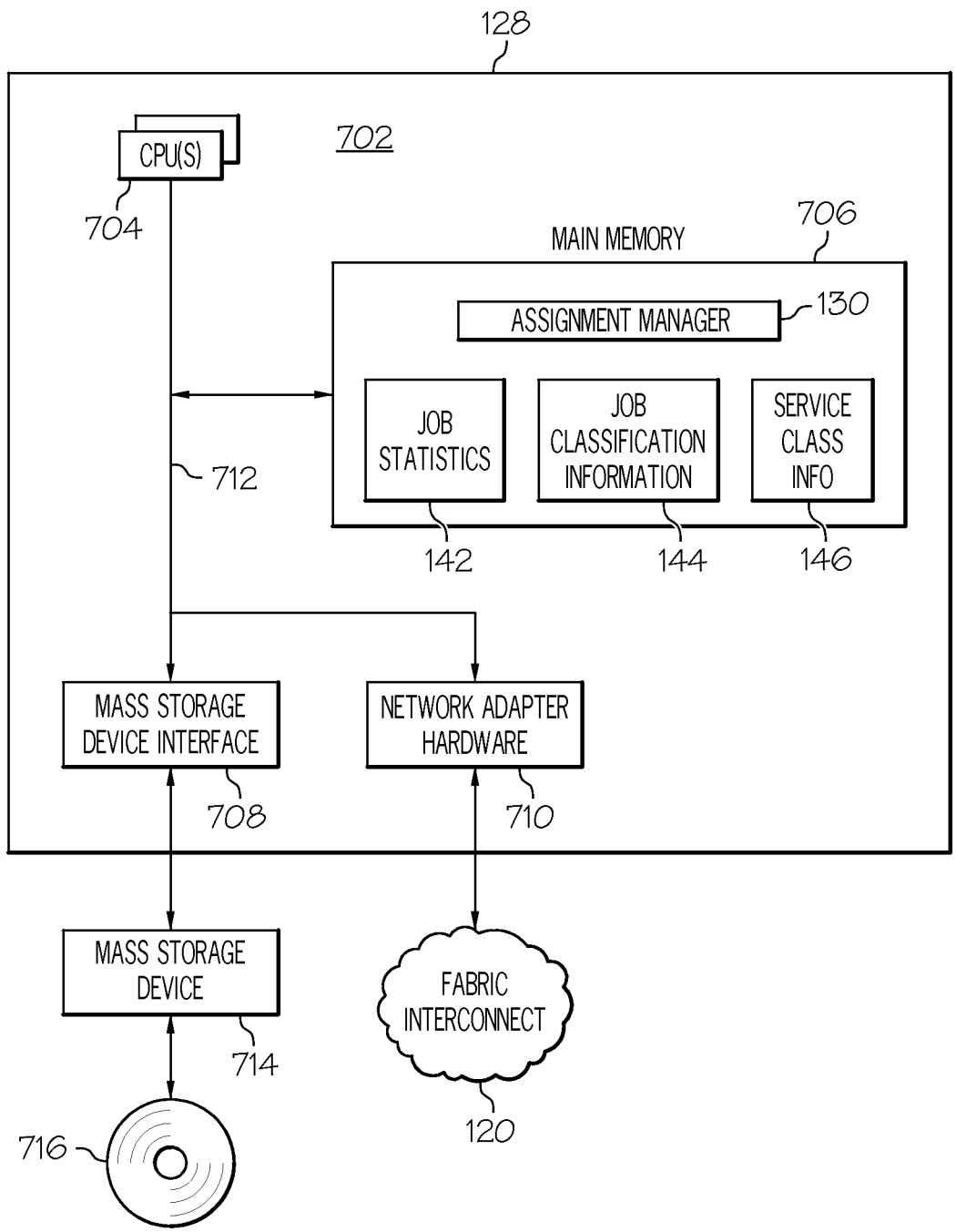
FIG. 7 is a block diagram illustrating an information processing system according to one embodiment of the present invention.

FIG. 7 is a block diagram illustrating an exemplary information processing system for use in embodiments of the present invention. Any suitably configured processing system is similarly able to be used as the information processing system in further embodiments of the present invention (for example, a personal computer, workstation, or the like). The information processing system includes a computer 702.

The computer 702 includes one or more processors 704 that are communicatively coupled to the main memory 706 via the system bus 712.

The computer 702 also includes a mass storage interface 708 and network adapter hardware 710. The mass storage interface 708 is used to connect mass storage devices 714 to the information processing system. One specific type of data storage device is an optical drive Disc, which may be used to store data to and read data from a computer readable storage medium such as a CD 716 or DVD. Another type of data storage device is a hard disk configured to support, for example, JFS type file system operations. In this embodiment, the main memory 708 is volatile memory such as random access memory ("RAM"). The main memory 708 of this embodiment comprises the assignment manager, its components, the job statistics, the job classification information, and the service class information.

The network adapter hardware 710 provides an interface to the interconnect fabric implementing data communications with other computers. Embodiments of the present invention are able to be adapted to work with any data communications connections including present day analog and/or digital techniques or via a future networking mechanism.

Although the exemplary embodiments of the present invention are described in the context of a fully functional computer system, further embodiments are capable of being distributed as a program product via a CD and its equivalents, floppy disk, or other form of recordable media, or via any type of electronic transmission mechanism.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for dynamically managing accelerator resources, the computer-implemented method comprising:
  initially assigning a first set of hardware accelerator resources to a first information processing system and a second set of hardware accelerator resources to a second information processing system, wherein each hardware accelerator resource in the first and second sets of hardware accelerator resources is one of a special-purpose hardware component and a special-purpose appliance that is separate from and located outside of the first and second information processing systems;
  monitoring, by at least one processor, a plurality of jobs running on the first and second information processing systems;
  determining, based on the monitoring, a set of performance parameters for each of the plurality of jobs, wherein the set of performance parameters comprises at least an amount of time at least one of the plurality of jobs stays within an accelerator queue waiting to be performed;
  identifying, based on the determining, a service class associated with each of the plurality of jobs;
  determining, for each identified service class, a performance related goal associated with the service class based on the set of performance parameters that has been determined;
  determining that at least one job running on the first information processing system fails to satisfy the performance related goal associated with the service class of the job; and
  dynamically reassigning, based on the determining, at least one hardware accelerator resource in the second set of hardware accelerator resources from the second information processing system to the first information processing system, wherein the dynamically reassigning is based on
    generating a queuing model associated with the service class of the job;
    learning, based on the queuing model, how long each job in the service class waits for hardware accelerator resource in the first set of hardware accelerator resources relative to a number of hardware accelerator resources in the first set of hardware accelerator resources; and
    estimating, based on the learning, an impact on an average response time of the service class if at least one hardware accelerator resource in the second set of hardware accelerator resources is dynamically reassigned to the first information processing system.

2. The computer-implemented method of claim 1, wherein the monitoring comprises analyzing runtime statistical information associated with the plurality of jobs.

3. The computer-implemented method of claim 1, wherein the dynamically reassigning is performed when a priority level associated with the one job is above a threshold.

4. The computer-implemented method of claim 1, further comprising:
  analyzing runtime statistical information associated with the plurality of jobs; and
  determining whether reassigning one or more hardware accelerator resources to the first information processing system will increase a likelihood that the one job satisfies the performance related goal.

5. The computer-implemented method of claim 4, wherein the dynamically reassigning is performed if the likelihood is above a threshold.

6. The computer-implemented method of claim 1, further comprising:
  comparing a first value that will be gained by the first information processing system if one or more hardware accelerator resources are reassigned to the first information processing system with a second value that will be lost by the second information processing if the one or more hardware accelerator resources are reassigned to the first information processing system, wherein the first value is based on the queuing model associated with the service class of the job running on the first information processing system, and wherein the second is based on a queuing model associated with at least one service class of jobs running on the second information processing system; and
  wherein the dynamically reassigning is performed if the first value that will be gained by the first information processing system is higher than the second value that will be lost by the second information processing system.

7. The computer-implemented method of claim 1, wherein the dynamically reassigning further comprises:
  instructing the second information processing system to stop issuing new jobs to the at least one hardware accelerator resource; and
  determining when all of the jobs that were issued by the second information processing system to the at least one hardware accelerator resources have completed.

8. An information processing system for dynamically managing accelerator resources, the information processing system comprising:
  a memory;
  a processor communicatively coupled to the memory; and
  an assignment manager communicatively coupled to the memory and the processor, the assignment manager being configure to:
    initially assign a first set of hardware accelerator resources to a first information processing system and a second set of hardware accelerator resources to a second information processing system, wherein each hardware accelerator resource in the first and second sets of hardware accelerator resources is one of a special-purpose hardware component and a special-purpose appliance that is separate from and located outside of the first and second information processing systems;
    monitor a plurality of jobs running on the first and second information processing systems;
    determine, based on monitoring the plurality of jobs, a set of performance parameters for each of the plurality of jobs, wherein the set of performance parameters comprises at least an amount of time at least one of the plurality of jobs stays within an accelerator queue waiting to be performed;
    identify, based on determining the set of performance parameters, a service class associated with each of the plurality of jobs;
    determine, for each identified service class, a performance related goal associated with the service class based on the set of performance parameters that has been determined;
    determine that a performance at least one job running on the first information processing system fails to satisfy the performance related goal associated with the service class of the job; and
    dynamically reassign, based on determining that the at least one job fails to satisfy the performance related goal, at least one hardware accelerator resource in the second set of hardware accelerator resources from the second information processing system to the first information processing system, wherein the at least one hardware accelerator resource is dynamically reassigned based on
generating a queuing model associated with the service class of the job;
learning, based on the queuing model, how long each job in the service class waits for hardware accelerator resource in the first set of hardware accelerator resources relative to a number of hardware accelerator resources in the first set of hardware accelerator resources; and
estimating, based on the learning, an impact on an average response time of the service class if at least one hardware accelerator resource in the second set of hardware accelerator resources is dynamically reassigned to the first information processing system.

9. The information processing system of claim 8, wherein the monitoring of the plurality of jobs comprises analyzing runtime statistical information associated with the plurality of jobs.

10. The information processing system of claim 8, wherein the dynamically reassigning is performed when a priority level associated with the one job is above a threshold.

11. The information processing system of claim 8, wherein the assignment manager is further configured to:
analyze runtime statistical information associated with the plurality of jobs; and
determine whether reassigning one or more hardware accelerator resources to the first information processing system will increase a likelihood that the one job satisfies the performance related goal.

12. The information processing system of claim 11, wherein the dynamically reassigning is performed if the likelihood is above a threshold.

13. The information processing system of claim 8, wherein the assignment manager is further configured to:
compare a first value that will be gained by the first information processing system if one or more hardware accelerator resources are reassigned to the first information processing system with a second value that will be lost by the second information processing if the one or more hardware accelerator resources are reassigned to the first information processing system, wherein the first value is based on the queuing model associated with the service class of the job running on the first information processing system, and wherein the second is based on a queuing model associated with at least one service class of jobs running on the second information processing system,
wherein the dynamically reassigning is performed if the first value that will be gained by the first information processing system is higher than the second value that will be lost by the second information processing system.

14. The information processing system of claim 8, wherein the dynamically reassigning comprises:
instructing the second information processing system to stop issuing new jobs to the at least one hardware accelerator resource; and
determining when all of the jobs that were issued by the second information processing system to the at least one hardware accelerator resources have completed.

15. A non-transitory computer readable storage medium for dynamically managing accelerator resources, the computer readable storage medium comprising instructions embedded thereon for performing a method comprising:
initially assigning a first set of hardware accelerator resources to a first information processing system and a second set of hardware accelerator resources to a second information processing system, wherein each hardware accelerator resource in the first and second sets of hardware accelerator resources is one of a special-purpose hardware component and a special-purpose appliance that is separate from and located outside of the first and second information processing systems;
monitoring a plurality of jobs running on the first and second information processing systems;
determining, based on the monitoring, a set of performance parameters for each of the plurality of jobs, wherein the set of performance parameters comprises at least an amount of time at least one of the plurality of jobs stays within an accelerator queue waiting to be performed;
identifying, based on the determining, a service class associated with each of the plurality of jobs;
determining, for each identified service class, a performance related goal associated with the service class based on the set of performance parameters that has been determined;
determining that at least one job running on the first information processing system fails to satisfy the performance related goal associated with the service class of the job; and dynamically, based on the determining, reassigning at least one hardware accelerator resource in the second set of hardware accelerator resources from the second information processing system to the first information processing system, wherein the dynamically reassigning is based on
generating a queuing model associated with the service class of the job;
learning, based on the queuing model, how long each job in the service class waits for hardware accelerator resource in the first set of hardware accelerator resources relative to a number of hardware accelerator resources in the first set of hardware accelerator resources; and
estimating, based on the learning, an impact on an average response time of the service class if at least one hardware accelerator resource in the second set of hardware accelerator resources is dynamically reassigned to the first information processing system.

16. The non-transitory computer readable storage medium of claim 15, wherein the monitoring comprises analyzing runtime statistical information associated with the plurality of jobs.

17. The non-transitory computer readable storage medium of claim 15, wherein the dynamically reassigning is performed when a priority level associated with the one job is above a threshold.

18. The non-transitory computer readable storage medium of claim 15, wherein the method further comprises:
analyzing runtime statistical information associated with the plurality of jobs; and
determining whether reassigning one or more hardware accelerator resources to the first information processing system will increase a likelihood that the one job satisfies the performance related goal.

19. The non-transitory computer readable storage medium of claim 18, wherein the dynamically reassigning is performed if the likelihood is above a threshold.

20. The non-transitory computer readable storage medium of claim 15, wherein the wherein the method further comprises:
- comparing a first value that will be gained by the first information processing system if one or more hardware accelerator resources are reassigned to the first information processing system with a second value that will be lost by the second information processing if the one or more hardware accelerator resources are reassigned to the first information processing system, wherein the first value is based on the queuing model associated with the service class of the job running on the first information processing system, and wherein the second is based on a queuing model associated with at least one service class of jobs running on the second information processing system; and
- wherein the dynamically reassigning is performed if the first value that will be gained by the first information processing system is higher than the second value that will be lost by the second information processing system.

* * * * *